(No Model.)

J. E. PLEW.
BICYCLE SADDLE.

No. 578,900.   Patented Mar. 16, 1897.

Witnesses.

Inventor.
Jas. E. Plew

UNITED STATES PATENT OFFICE.

JAMES E. PLEW, OF CHICAGO, ILLINOIS.

BICYCLE-SADDLE.

SPECIFICATION forming part of Letters Patent No. 578,900, dated March 16, 1897.

Application filed September 14, 1896. Serial No. 605,811. (No model.)

*To all whom it may concern:*

Be it known that I, JAMES E. PLEW, a citizen of the United States, residing at Chicago, in the county of Cook and State of Illinois, have invented a new and useful Improvement in Bicycle-Saddles, of which the following is a specification.

My invention relates to improvements in bicycle-saddles; and its object is to make a comfortable and healthy saddle.

My invention consists, substantially, in the construction set forth in the subjoined specification and more particularly pointed out in the claims.

Like letters refer to the same parts in the several figures of the drawings, in which—

Figure 1:
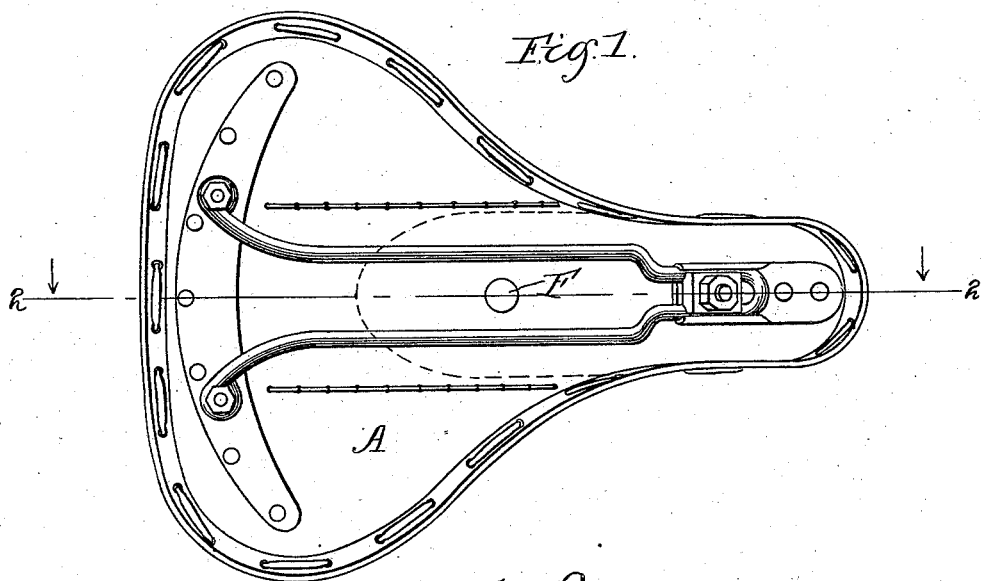
Figure 2:
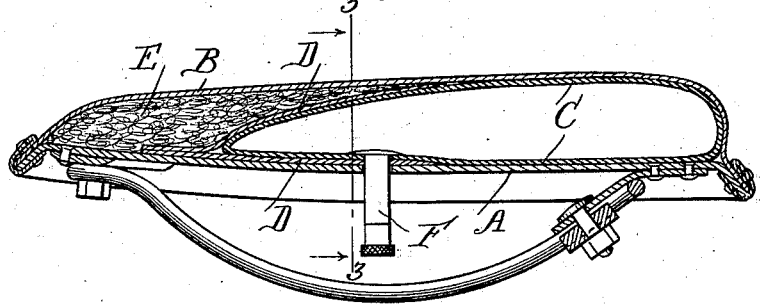
Figure 3:
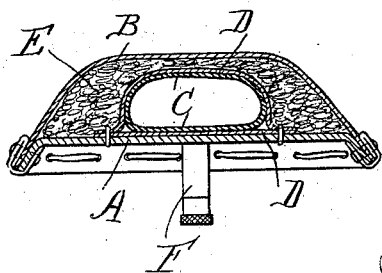

Figure 1 illustrates a plan view of the saddle. Fig. 2 illustrates a longitudinal sectional view on the line 2 2, Fig. 1. Fig. 3 is a cross-section on the line 3 3, Fig. 2.

The primary portion or base of the saddle is composed of a firm and practically unyielding material, and I have found it advantageous to construct it of sheet-steel, although any suitable material of the character specified may be utilized. This base is designated by the letter A in the drawings, and, as shown in the longitudinal vertical sectional view, extends from point to rear of the saddle, being narrowed at the point or pommel, as is usual in such cases, and curved or shaped as is desired, so as to widen it into a seat. Upon this base is mounted the superstructure of the saddle, and it is of great importance how this superstructure shall be made and located.

As shown in the drawings, the forward or pommel portion of the base is covered by a pneumatic or soft cushion, which extends rearwardly about the length of the pommel proper of the saddle. This pneumatic cushion is formed in any suitable way, but preferably with a textile bag suitably secured in place. The rear or seat portion of the saddle must be firm, as contradistinguished from resilient or elastic, but may be provided with a thin non-elastic padding, so as to remove the person of the rider from contact with the base itself. The dotted line in Fig. 1 indicates a preferred relative proportion of the soft part and the hard part of the saddle.

The pneumatic cushion or soft part of the saddle is designated by the letter C and the rear or comparatively hard portion of the saddle by the letter E. A canvas covering D may be provided and a leather covering B over all. A pneumatic cushion C forms the pommel or nose of the saddle, and this is the part which comes in contact with the portion of the person of the rider which is most sensitive and not intended to sit upon, while the comparatively hard rear or seat portion affords a firm rest for that portion of the rider which nature has designed to support the body in a seating position.

It will be readily observed that this saddle differs from the ordinary pneumatic saddle in having a firm rear portion or seat upon which the weight of the rider rests and a pneumatic or soft cushion for the nose or pommel, which, while serving as a guide or obstruction to lateral displacement, yet is so soft as not to injure, irritate, or excite the organs of the body superposed over this portion of the saddle. It differs from the ordinary leather saddle in that the seat portion retains its permanent shape, which is adapted to the contour of the parts resting upon it and is not capable of being stretched or extended out of such shape either by excessive weight or sudden strain or condition of the weather, and, further, in that while the pommel in this saddle is, as before observed, elastic or soft the pommel in the ordinary leather saddle is hard, for it (the latter) consists of a rigid base with simply a covering of leather or light padding, which padding soon becomes packed and hard.

The canvas covering D is of a strong or unyielding cloth, and this prevents the pneumatic bag from bulging and creating an unnatural shape and unsightly appearance. The slight padding on the seat portion of the saddle may be composed of thick firm felt, hair, or similar material. The covering B is preferably of leather and may be secured to the metal base in any suitable manner.

The saddle as a whole may of course be made in a variety of shapes adapted to the physique and sex of the rider.

I am well aware that a pneumatic saddle is old and well known and that a leather or flexible saddle with pneumatic cushion at front and rear is old, but neither of these answers the conditions which it is the purpose of my improved saddle to fulfil.

What I claim, and desire to secure by Letters Patent, is—

1. The combination with a practically rigid base, extending from front to the rear of a bicycle-saddle, with a soft or yielding nose or pommel superposed upon the forward part of such base and suitably secured in place; substantially as and for the purpose set forth.

2. In a bicycle-saddle, the combination with a rigid base, extending from the front to the rear of the saddle and shaped and narrowed into a pommel or nose at the forward portion, with a superposed pneumatic cushion upon the pommel or nose, and suitably secured in place; substantially as and for the purpose set forth.

3. In a bicycle-saddle, the combination with a rigid base, extending from front to rear of the saddle and formed with a narrowed or nose portion and a widened or seat portion, with a superposed covering for the seat of comparatively inelastic material and a superposed pneumatic cushion for the nose or pommel portion and the whole covered with leather and fastened together; substantially as and for the purpose set forth.

JAS. E. PLEW.

Witnesses:
FRANK. ANDREWS,
JOHN HARBISON.